United States Patent
Sonohara et al.

(10) Patent No.: US 7,348,696 B2
(45) Date of Patent: Mar. 25, 2008

(54) STEPPING MOTOR

(75) Inventors: Hiroyuki Sonohara, Nagano (JP); Shinichi Utsumi, Nagano (JP)

(73) Assignee: NIDEC Sankyo Corporation, Nagano (JP)

(*) Notice: Subject to any disclaimer, the term of this patent is extended or adjusted under 35 U.S.C. 154(b) by 0 days.

(21) Appl. No.: 11/376,017

(22) Filed: Mar. 14, 2006

(65) Prior Publication Data

US 2006/0261684 A1     Nov. 23, 2006

(30) Foreign Application Priority Data

Mar. 14, 2005  (JP) ............................. 2005-071212

(51) Int. Cl.
*H02K 37/00*  (2006.01)

(52) U.S. Cl. .................. 310/49 R; 310/71; 310/89

(58) Field of Classification Search ............. 310/49 R, 310/71, 89

See application file for complete search history.

(56) References Cited

U.S. PATENT DOCUMENTS

| 5,298,820 | A * | 3/1994 | Lee et al. ............. 310/40 MM |
| 2004/0010908 | A1* | 1/2004 | Kobayashi .................. 29/596 |
| 2005/0046305 | A1* | 3/2005 | Matsushita et al. ......... 310/257 |
| 2006/0261684 | A1* | 11/2006 | Sonohara et al. ......... 310/49 R |

FOREIGN PATENT DOCUMENTS

JP       2004-112985       4/2004

* cited by examiner

*Primary Examiner*—Darren Schuberg
*Assistant Examiner*—Hong-Vinh Nguyen
(74) *Attorney, Agent, or Firm*—Reed Smith LLP

(57) ABSTRACT

A stepping motor comprises a stator core, a drive coil which is attached to the stator core and a terminal block having a plurality of terminal pins to be wound with the terminals of the drive coil windings. The stator core and terminal block have respective fitting parts. The fitting part of the terminal block is fitted to the fitting part of the stator core. A gap is provided between the terminal block and the drive coil.

3 Claims, 7 Drawing Sheets

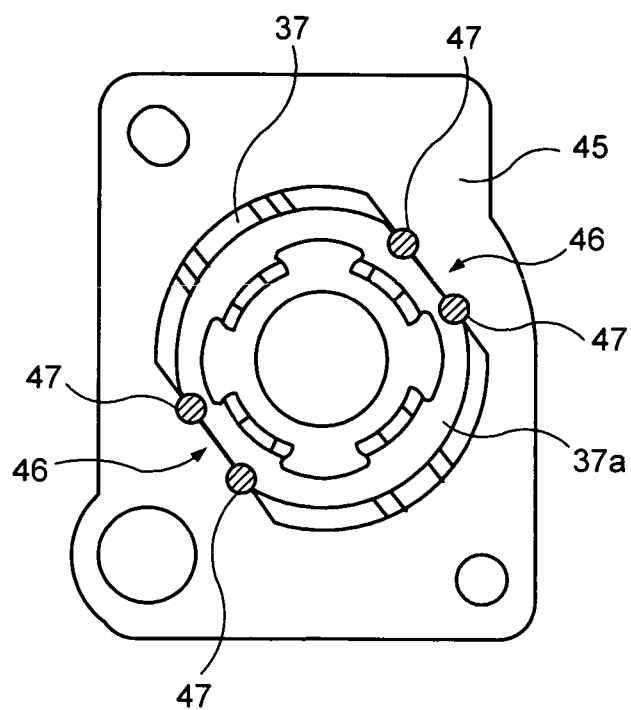
F I G. 8
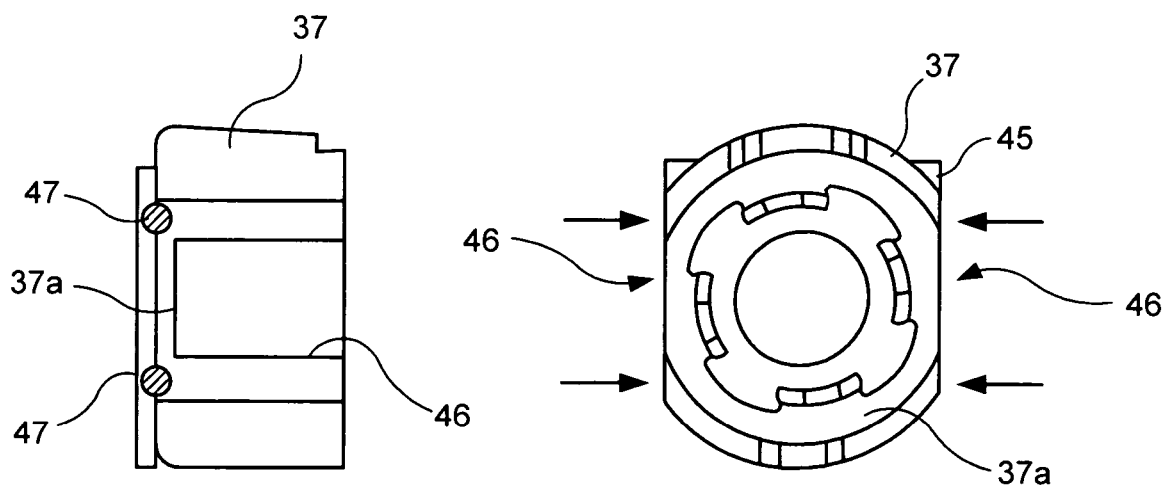
F I G. 9A  F I G. 9B

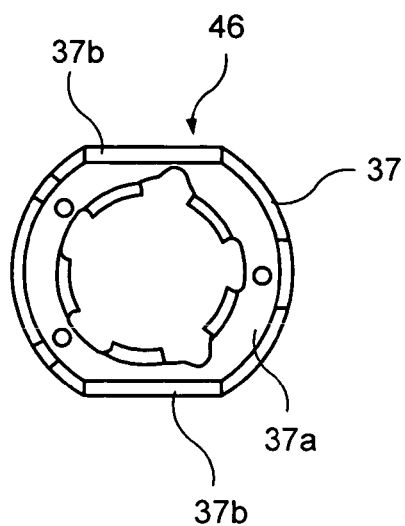 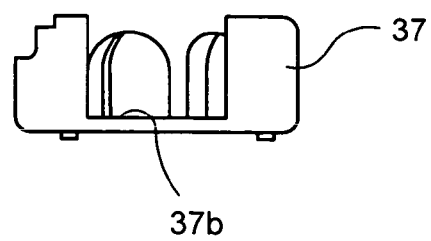
FIG. 10A  FIG. 10B
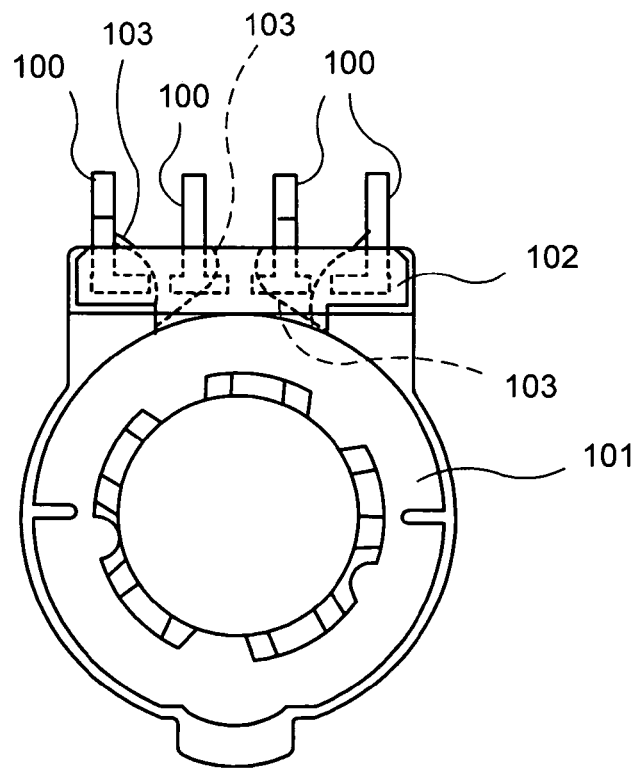
FIG. 11

STEPPING MOTOR

CROSS-REFERENCE TO RELATED APPLICATION

This application claims priority of Japanese Application No. 2005-071212, filed Mar. 14, 2005, the complete disclosure of which is hereby incorporated by reference.

BACKGROUND OF THE INVENTION a) Field of the Invention

This invention relates to a stepping motor. More specifically, this invention relates to a structure of the terminals of the stepping motor.

b) Description of the Related Art

Generally, a stepping motor comprises a rotor part having a magnet fixed onto a rotor shaft, a stator part facing the rotor part, a circular coil bobbin, and a coil wound around the body of the coil bobbin.

In order to attain miniaturization of such a stepping motor, in the case of a motor size of less than 10 mm in diameter for example, the bobbin size has been reduced by integrating the coil bobbin into the inner stator core constituting the stator part by means of insert molding.

Furthermore, when the motor size is less than 5 mm in diameter in which a coil bobbin is molded with the inner stator core as an integrated body, the coil bobbin occupies a large proportion of the motor. As a result, the required winding space cannot be secured and the needed motor torque cannot be obtained.

To overcome this problem, an insulating film is formed on the surface of the stator core, and the coil bobbin is omitted to eliminate the proportion occupied by the coil bobbin. A stepping motor having an elongated space for coil winding has been thus developed (see Unexamined Japanese Patent Application Publication No. 2004-112985, for example). In a stepping motor of this type, terminals are provided at the side planes of the coil windings. As illustrated in FIG. 11, terminal 100 is made up of a pin which is formed integrally with bobbin 101 and terminal block 102 by insert molding. And terminal part 103 of the coil windings is wound around terminal 100.

PROBLEMS TO BE SOLVED BY THE INVENTION/DISCOVERY OF THE INVENTORS

However, since terminal 100 mentioned above is integrated with bobbin 101, in the stepping motor with two coils in which four terminals 100 are arranged about linearly, it is difficult to reduce the length of the motor of terminal block 102 along the circumference of the motor. For this reason, even if the size of the motor case is reduced, terminal block 102 occupies the width, preventing the motor from being miniaturized.

Moreover, the part between the coil body of edge 103 of the coil windings and terminal 100 is slanted with respect to terminal 100 in many cases. For this reason, when an FPC or the like is attached to terminal 100 later, there is a possibility that the coil windings touch the edge of the through hole through which terminal 100 of FPC is inserted resulting in their breakage.

OBJECT AND SUMMARY OF THE INVENTION

Therefore, the primary object of the present invention is to provide a stepping motor which can miniaturize a terminal block and prevent the coil windings from their breakage.

In order to achieve this object, the present invention is directed to a stepping motor which comprises a stator core, a drive coil to be attached to the stator core, and a plurality of terminal pins to be wound with the terminals of the drive coils, wherein the fitting part of a terminal block is fitted to the fitting part of the stator core, and a gap is provided between the terminal block and the drive coil. Since the terminal block and the stator core are separate components, the terminals can be arranged with a higher degree of freedom.

Further in accordance with the invention, the periphery of the fitting part of the terminal block on the side to be fitted to the fitting part of a stator core, a plurality of projections are formed to prevent the windings from breaking and the terminal block from falling. In this way, the winding does not touch the edge of the case; this prevents the windings from breaking and the terminal block from falling.

Still further, in accordance with the invention, for the stepping motor comprising a stator core, a drive coil to be attached to said stator core, and a plurality of terminal pins to be wound with the terminals of windings of said drive coil, wherein the fitting part of the terminal block is fitted to the fitting part of the stator core and a step is formed around the terminal pins of the terminal block to prevent the windings from breaking at the time of connection to the outside, and, furthermore, the windings are wound around the terminal pins after being laid along the step. This causes the windings to be wound at a right angle with respect to the terminal pins. As a result, when an FPC or the like is attached from the outside of the motor, the edge of the FPC does not touch the windings, thus preventing the windings from breakage.

Moreover, in accordance with the invention, for the stepping motor as described above, the drive coil is an air core coil. Therefore, a small stepping motor without a coil bobbin can be used.

In accordance with the stepping motor of the present invention, since the terminal block and the stator core are separate components, terminals can be arranged with a higher degree of freedom. As a result, miniaturization of a terminal block can be made possible without the conventional linear arrangement along the circumference; this consequently makes miniaturization of a motor possible. Moreover, since a terminal block can be formed separately from a stator core by insert molding, press fitting, or the like, components can be made at low cost.

Still further in accordance with the stepping motor of the present invention, the windings do not touch the edge of the case; this prevents the windings from breaking and the terminal block from falling. Hence, reliability of the motor can be enhanced.

In addition, according to the stepping motor of the present invention, since the windings are wound at a right angle with respect to the terminal pins, when attaching an FPC or the like from the outside of the motor, the edge of the FPC does not touch the windings; this prevents the windings from breaking. As a result, the motor can be installed with a good yield.

Furthermore, according to the stepping motor in accordance with the present invention, a small stepping motor without a coil bobbin can be used.

BRIEF DESCRIPTION OF THE DRAWINGS

In the drawings:

FIG. 8 is a bottom view showing the welded (locations) between a motor case and a mounting plate;

FIG. 9 is a diagram showing the welded (locations) between a motor case of another example and a mounting plate: (a) is a side view and (b) is a bottom view; and FIG. 10 is a diagram showing a motor case of another example: (a) is a front view and (b) is a side view.

FIG. 11 is a front view showing the relationship between a terminal block and a stator of conventional technology.

DESCRIPTION OF THE PREFERRED EMBODIMENTS

Figure 1:
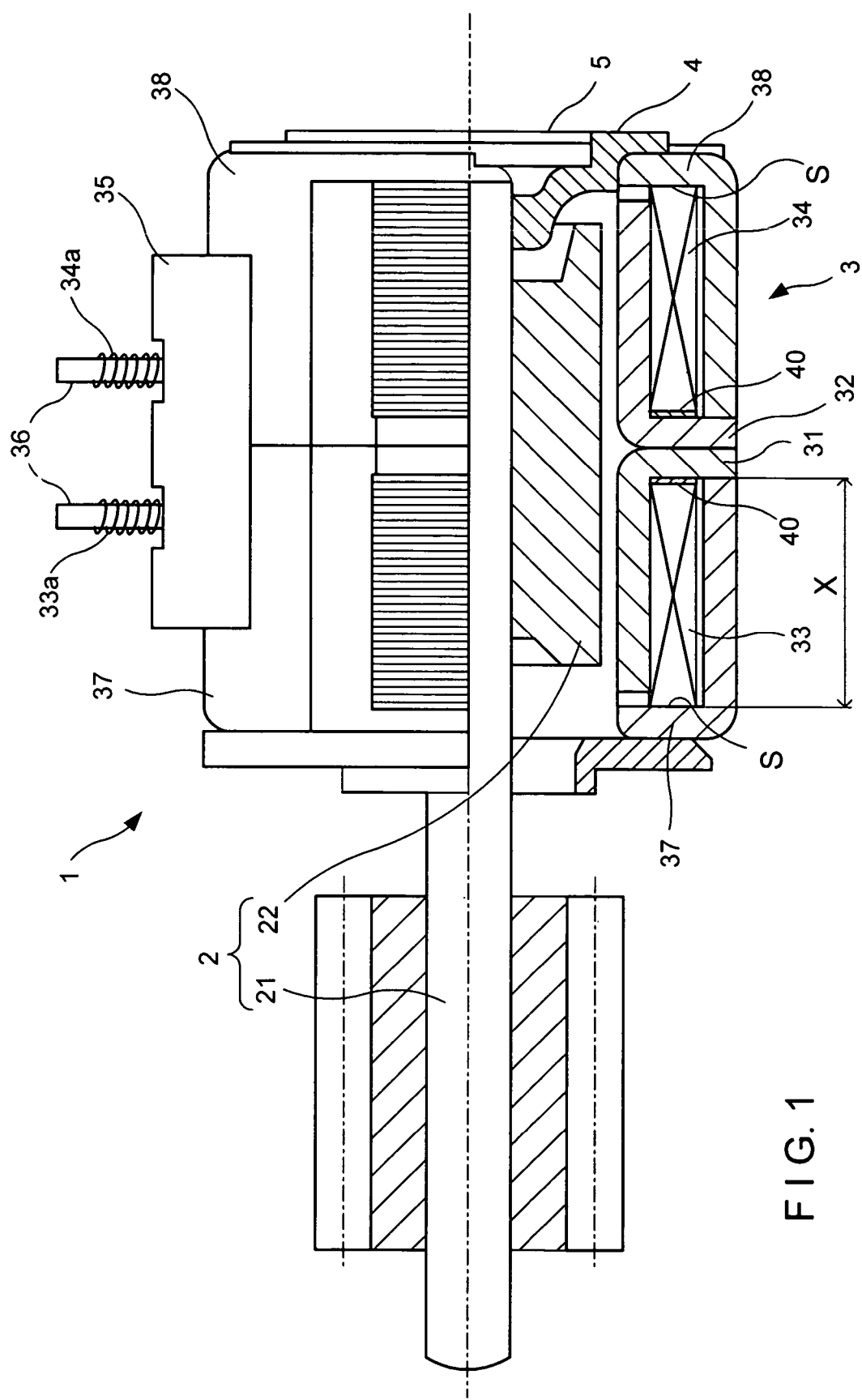
FIG. 1 is a cross-sectional side view showing the stepping motor associated with this embodiment.

FIG. 1 is a cross section of the principal part of the PM (permanent magnet) type stepping motor to which the present invention is applied.

Figure 2:
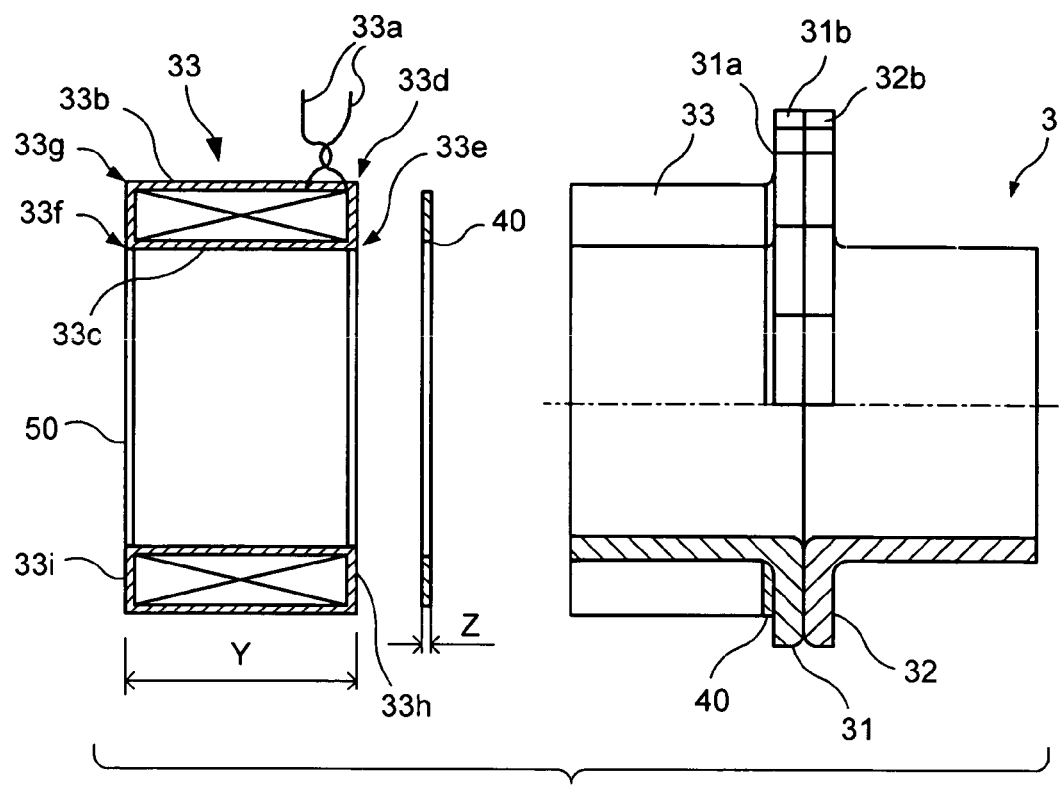
FIG. 2 is a disassembled view showing the air core coil and insulation sheet of the present invention.

FIG. 2 is a diagram showing the structure of stator part 3 of stepping motor 1 shown in FIG. 1.

Stepping motor 1 associated with this embodiment as illustrated in FIG. 1 comprises rotor part 2 having rotor shaft 21 and rotor magnet 22, (permanent magnet) and a stator part 3 arranged opposite to rotor magnet 22 via a gap; rotor shaft 21 is rotatably supported by bearing 4, and what is more, it is energized in the axial direction with spring member 5 contacting one end of rotor shaft 21. In addition, the other end side of rotor shaft 21 is rotatably supported by a bearing (not illustrated) which is different from bearing 4. This different bearing is provided, for example, at the opening at the exit end of first stator core 31, near the opening inside the mounting plate, or the tip of rotor shaft 21 via a casing (not illustrated).

To rotor shaft 21 constituting rotor part 2 fixed is rotor magnet 22 with an adhesive, wherein rotor magnet 22 is constructed with a permanent magnet in about a cylindrical shape.

Furthermore, circular concavities are formed on both ends of rotor magnet 22 in its axial direction. The formation of these concavities enables rotor magnet 22 reduces the weight further. Thus, the moment of inertia of the rotor magnet 22 is reduced by means of the weight reduction.

The other end of rotor shaft 21 serves as an output axis extended to output the rotation of stepping motor 1.

Stator part 3 is made in a two-phase structure comprising first stator core 31 and second stator core 32 fixed onto first stator core 31 in back to back.

First and second stator cores 31 and 32 are constructed in such a manner that a plurality of pole teeth are alternately combined. The outer circumferences of these pole teeth and the inner clip washers between pole teeth are chamfered. As a result, the possibility of deterioration of insulation caused by burrs on pole teeth of air core coil 33 and 34 can be reduced. Therefore, it is preferable to chamfer the burrs to keep their sizes within 0.03 mm.

Circular air core coil 33 is arranged on the outer circumference of each of the pole teeth of first stator core 31, and similarly, circular air core coil 34 is arranged on the outer circumference of each of the pole teeth of second stator core 32.

Insulating films 50 for insulation enhancement are formed on the entire surfaces of these circular air core coils 33 and 34.

Furthermore, insulation sheet 40 is sandwiched between first stator core 31 and air core coil 33 and is firmly bonded to first stator core 31 and air core coil 33 with an adhesive in this embodiment. Similarly, insulation sheet 40 is bonded firmly bonded between second stator core 32 and air core coil 34 with an adhesive.

Figure 3:
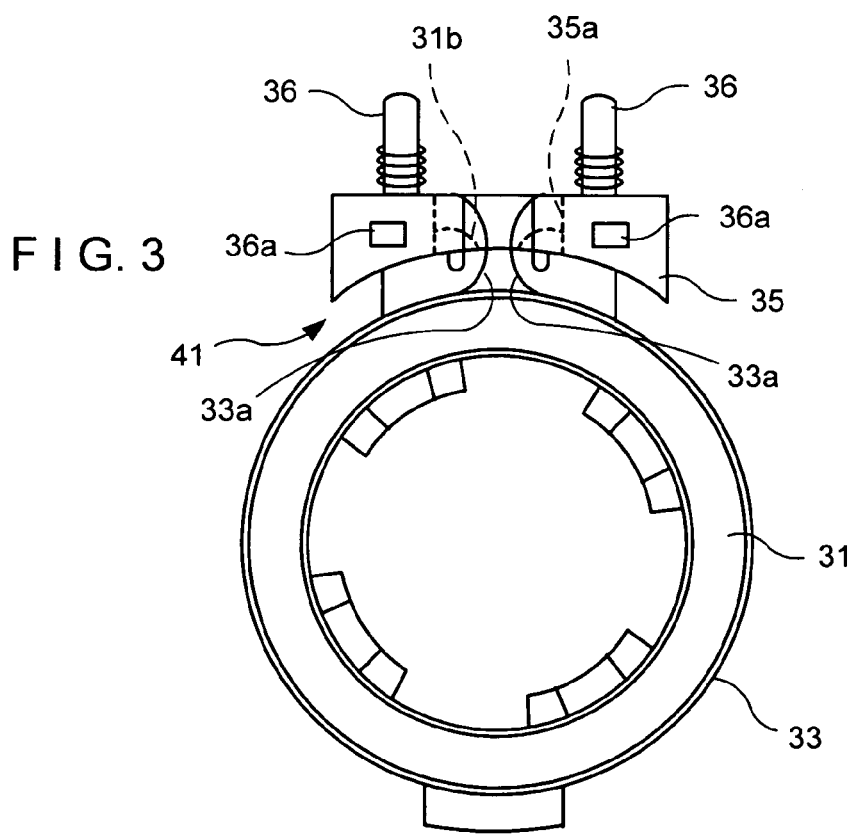
FIG. 3 is a front view showing the relationship between a terminal block and a stator.
Figure 4:
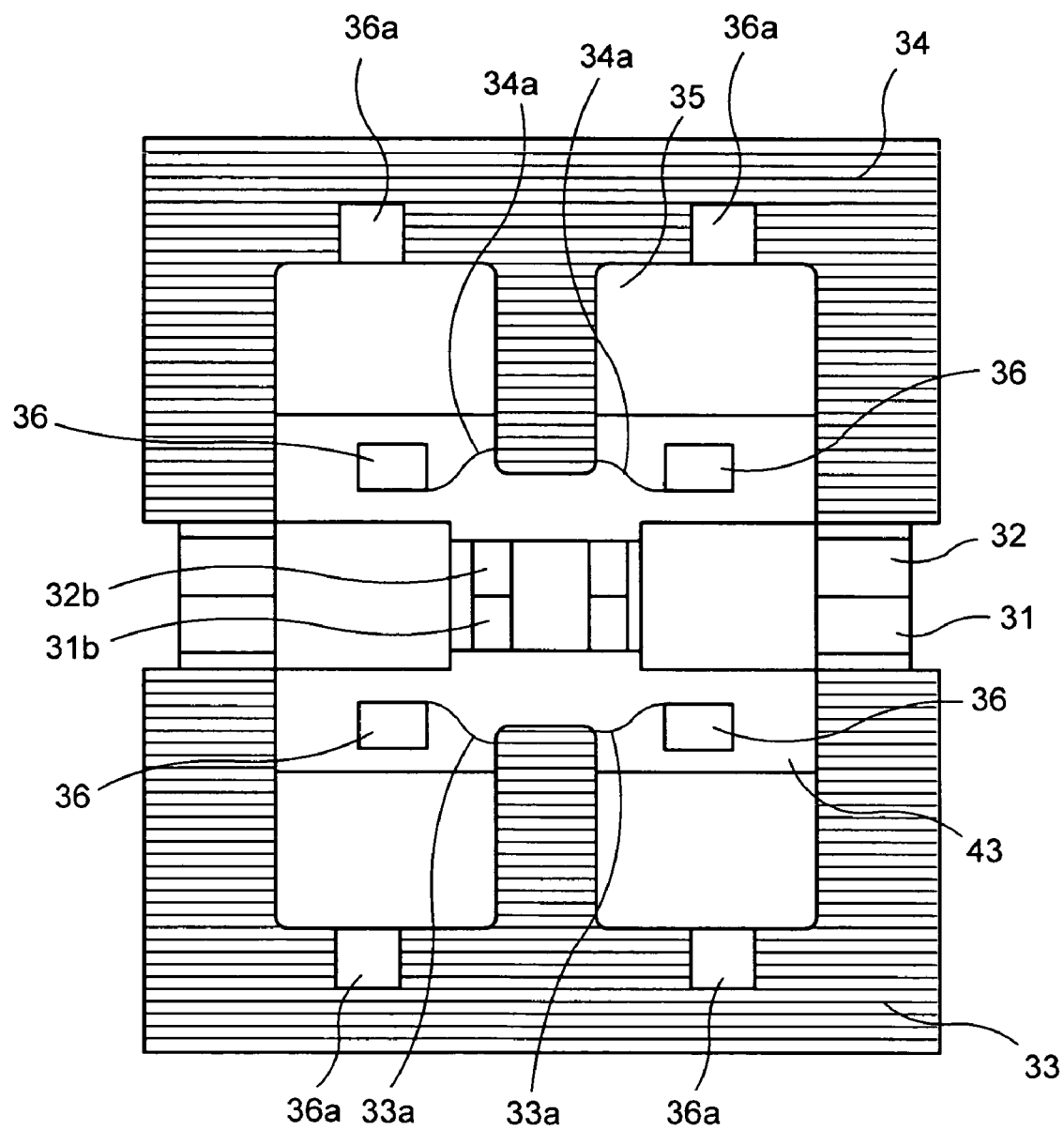
FIG. 4 is a plan view showing the relationship between a terminal block and a stator.
Figure 5A:
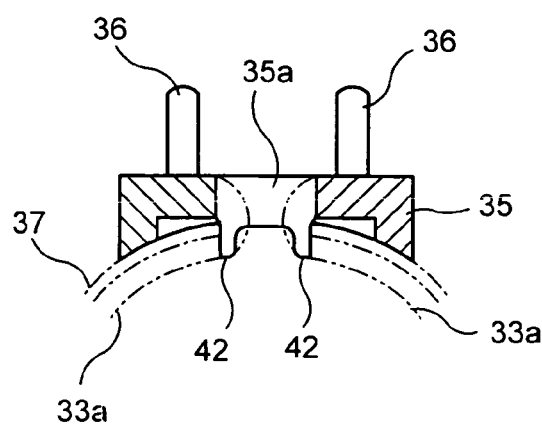
FIG. 5 is a diagram showing a terminal block; (a) is a cross section in which (b) is cut along the I-I line; (b) is a plan view; and (c) is a cross section in which of (b) is cut along the II-II line; and (d) is a bottom view.
Figure 5B:
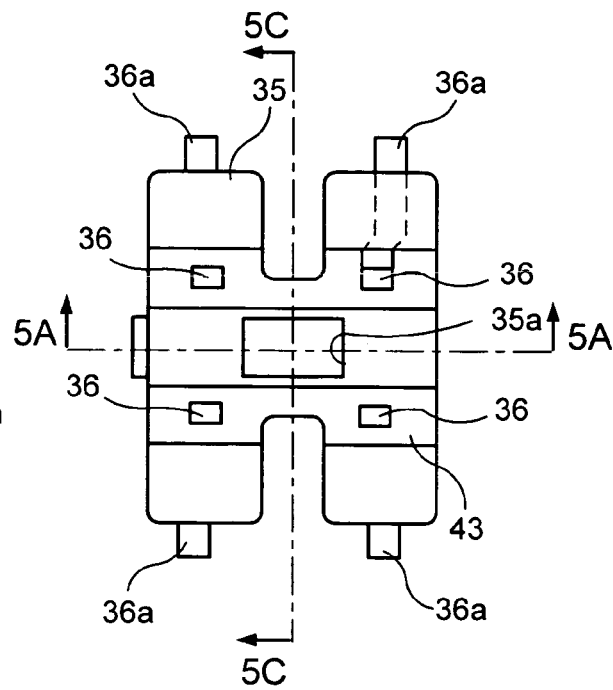
Figure 5C:
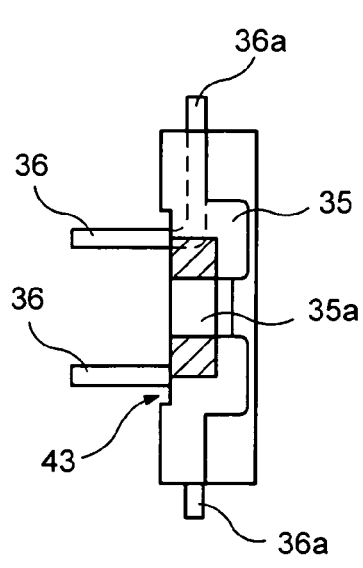
Figure 5D:
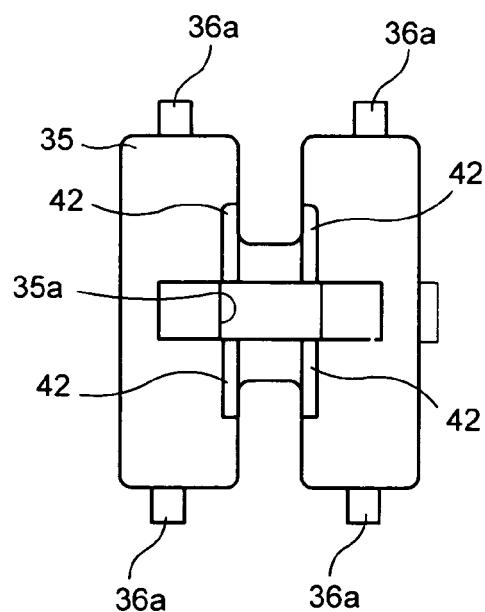

This stepping motor 1 comprises stator cores 31 and 32, air core coils (drive coils) 33 and 34 attached to the stator cores 31 and 32, and terminal block 35 having a plurality of terminal pins 36 to be wound around terminals 33a and 34a of air core coils (drive coils) 33 and 34. As illustrated in FIGS. 3 and 4, fitting part 35a of terminal block 35 is fitted to fitting parts 31b, 32b of stator cores 31 and 32, and at the same time, gap 41 is provided between terminal block 35 and drive coils 33 and 34.

Fitting part 35a of terminal block 35 is in the form of a through hole. Moreover, fitting parts 31b and 32b of stator cores 31 and 32 are made up of projections to be pressed into fitting part 35a. This enables easy assembly of the part, and what is more, it can prevent terminal block 35 from collapsing. As shown in FIG. 5, terminal pin 36 is a metallic L-shaped pin. And terminal pin 36 is formed as terminal block 35 by insert molding with an insulation material made of a liquid crystal polymer. The use of liquid polymer provides a high heat-resistance property.

Terminal pin 36 is arranged in a square configuration. This allows the length of a motor for terminal block 35 to be shorter in the circumferential direction than the case of the conventional linear arrangement. Motor 1 can thus be miniaturized.

Each terminal pin 36 is formed in parallel with the radial direction of motor 1. Base 36a of each terminal pin 36 points toward the axial direction of motor 1, and it slightly projects from terminal block 35. Since this makes wiring to base 36a possible, even if wiring cannot be provided to terminal pin 36 due to lack of installation space or the like, it can be provided to base 36a. Moreover, even after motor 1 is installed in equipment, electrical characteristics of motor 1 can be checked by utilizing base 36a. Furthermore, the L-shape of terminal pin 36 provides a significantly strong resistance to falling.

Moreover, a plurality of projections 42 are formed on the periphery of fitting part 35a of terminal block 35 on the side to be fitted to parts 31b, 32b of stator cores 31 and 32. This prevents terminals 33a and 34a of windings from touching the edge of the through hole through which the coil of motor case 37 is taken out as shown in FIG. 5 (a); this prevents the wire from breakage caused by the edges. Moreover, capture of projection 42 with the edge of motor case 37 prevents terminal block 35 from falling.

Figure 6:
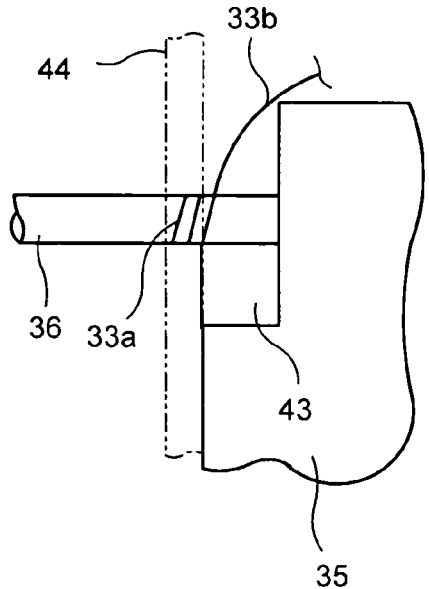
FIG. 6 is a side view showing the details of the step.

Furthermore, step 43 is formed around the terminal pin 36 of terminal block 35, and what is more, terminals 33a and 34a of windings are wound around the terminal pin 36 after being laid along step 43. As a result, as shown in FIGS. 6 and 4, since terminal 33a of winding reaches terminal pin 36 within step 43, even if a FPC44 or the like is attached later, part 33b, which is a portion right before reaching terminal pin 36 of the winding, does not interfere. This eliminates the possibility for FPC44 to break said part 33b and enables the yield in installation of motor 1 to be increased.

Furthermore, first stator core 31 is stored in the other first stator core 37, and similarly, second stator core 32 is stored in the other second stator core 38.

Furthermore, in this embodiment, the other first stator core 37 also functions as a motor case, and it is referred to as first motor case 37 hereinafter.

Similarly, the other second stator core 38 is referred to as second motor case 38. As shown in FIG. 1, first and second stator cores 31 and 32, first motor case 37, and second motor case 38 are arranged on the same concentricity of the axis of rotor shaft 21, and they are firmly bonded by welding.

Figure 7A:
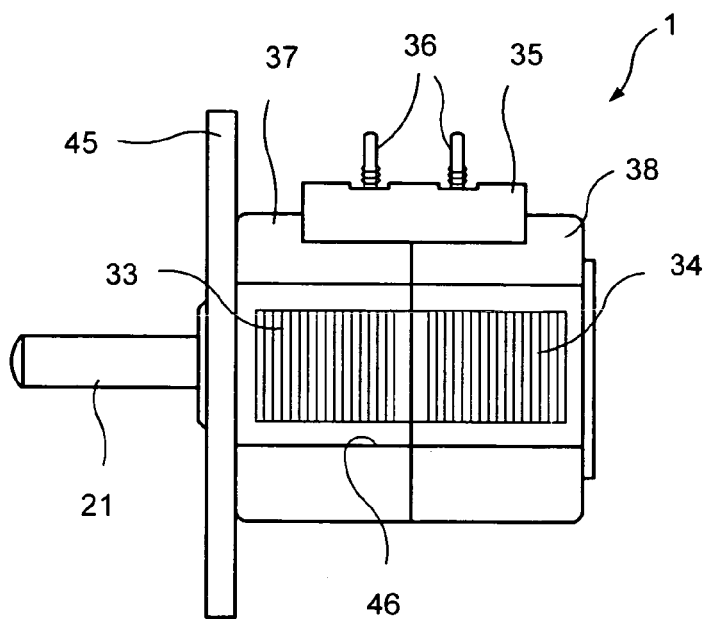
FIG. 7 is a diagram showing a motor: (a) is a side view and (b) is a bottom view.
Figure 7B:
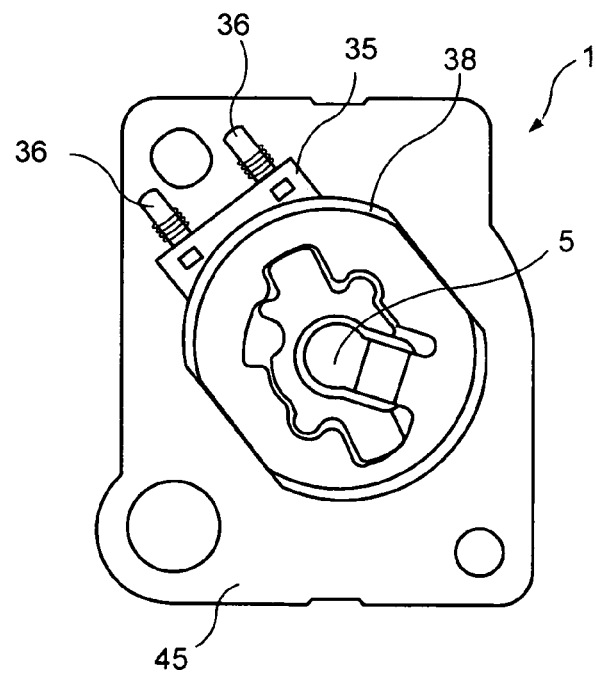

Here, as shown in FIGS. 7 and 8, motor 1 comprises motor case 37 provided with opening 46 and mounting plate 45 for mounting said motor case 37, and the plane wherein the cross section of opening 46 of motor case 37 comes in contact with mounting plate 45 is fixed with the plane of mounting plate 45 by welding.

first motor case 37 is formed in a cylindrical shape with a bottom by reducing work, and the two planes facing each other on the circumferential side plane are cut in the axial direction so as to provide bottom surface 37a with an oval shape. Moreover, mounting plate 45 for installation of the motor case 37 is sufficiently larger than bottom surface 37a of motor case 37. And as shown in FIG. 8, laser welding is provided along the axial direction to the step between bottom surface 37a of motor case 37 and mounting plate 45 (Reference Numeral 47 in the figure is the point to be welded). Positions and the number of welded location 47 can be set arbitrarily.

In this embodiment, as illustrated in FIGS. 1 and 2, the relationship among length X along the axial direction formed by first stator core 31 and first motor case 37, length Y along the axial direction of air core coil 33, and thickness Z of insulation sheet 40 is described as X>Y+Z.

In order to secure insulation between the edge along the axial direction of first motor case 37 and the edge of air core coil 33 facing the edge of first motor case 37, gap S is formed. Similarly, gap S is formed along the axial direction of second motor case 38 and air core coil 34.

Bearing 4 is made of a resin which has lubricity and rotatably supports one end of rotor shaft 21 in the radial direction.

Formed on bearing 4 which supports (stepping motor 1) in the radial direction are a bearing part to which rotor shaft 21 is supported by insertion to the bearing, a press fitting part which is secured onto the inner diameter of second stator core 32 by press fitting, and a flange part in which a part of the outer circumference of the flange part projects in the radial direction.

The above-mentioned bearing part of bearing 4 is arranged so that it enters the concavity formed on rotor magnet 22, thereby reducing the size of the overall stepping motor 1 in the axial direction.

Furthermore, as compared to the outer diameter of rotor shaft 21, the inner diameter of the above-mentioned bearing part is larger to the degree that it can have a clearance.

Moreover, the above-mentioned flange of bearing 4 is mounted on second stator core 32 and aligned in the axial direction.

Spring member 5 is made up of a sheet of metal plate, and comprises a piece of spring contacting one end of rotor shaft 21 and a center hole.

Moreover, spring member 5 is welded and fixed to second motor case 38.

The above-mentioned spring of spring member 5 contacts one end of rotor shaft 21 and energizes rotor shaft 21 in the axial direction.

Next, the air core coil constructing a stator part and the insulation sheet are explained with reference to FIG. 2.

In addition, in this embodiment, while stator part 3 comprises two sets, since they have the same structure, first stator part 3 is described here, and the description of second stator core 32 is omitted.

Air core coil 33 which is fitted to first stator core 31 is made by coating insulating film 50 onto the entire surface of a coil with a plurality of windings.

The surface of the above coil windings is provided with a thin self-fusing layer such that the self-fusing layer melts by heating and causes adjacent coil windings to be firmly bonded.

Moreover, insulating film 50 formed on the entire surface of a coil with a plurality of windings is a paint containing a polyimide resin as its major component in this embodiment.

This air core coil 33 is manufactured as follows.

First, the above-mentioned coil is wound around a bar which serves as the core coil as many turns as it is required to obtain a given motor torque in such a manner that starting end 33a and finishing end 33a of the coil are exposed to the surface of the layer of windings.

In addition, the outer diameter of the bar which serves as the coil core is allowed to be about the same as the outer circumference made of a plurality of pole teeth formed on first stator core 31.

Hot air blown on the coil from the outside during winding to cause self-fusing simultaneously with winding and to bond coil windings wound around the coil core. After fusing, the bar, which is the coil core, is pulled out. Thus, the coil windings form air core coil 33.

Furthermore, self-fusing of the coil may be provided, after winding a coil, by applying a given voltage between starting end 33a and finishing end 33a, feeding a current through the coil windings to generate heat, and fusing and solidifying the self-fusing layer on the surface of the coil windings, thereby bonding coil windings wound around the coil core.

Next, insulating film 50 is formed on the surface of air core coil 33 by dip coating.

In short, dip coating comprises dipping of air core coil 33 into a tank containing a paint having a polyimide resin as its main component, pulling out the air core coil, and air-blowing to blow away the paint and drying the air core coil. The above-mentioned process is repeated until a given film thickness, for example, about a 30-micrometer in this embodiment is obtained. It is preferable that the thickness of an insulating film be larger than the size of a burr or dimple of a stator core to which the air core coil is fitted or firmly bonded. On the other hand, if an insulating film is too thick, the size of a coil increases. Therefore, it is preferable that the thickness of the insulating film be kept at 100 micrometers or less.

Between edge 33h along the axial direction of air core coil 33 and edge 31a of first stator core 31, insulation sheet 40 is sandwiched.

Insulation sheet 40 has a ring shape, and in this embodiment, its material is polyethylene terephthalate. Although its thickness is 16 micrometers in this embodiment, the withstand voltage is over 100V, which can secure good insulation characteristics.

As compared to insulating film 50, insulation sheet 40 has more tenacity.

Furthermore, in this embodiment, while the inner diameter of insulation sheet 40 is almost the same as the outer circumferences of a plurality of pole teeth of the first stator core 31, and what is more, its outer diameter is smaller than the outer diameter of first stator core 31.

The use of a smaller diameter than the outer diameter of first stator core 31 enables first stator core 31 and second stator core 32 to be welded without interference.

Furthermore, air core coil 33, insulation sheet 40, and first stator core 31 are fixed with an adhesive. The fixation prevents air core coil 33 from shifting in the axial direction and contacting the edge of first motor case 37 facing in the axial direction.

Moreover, in dip coating, in comparison with outer circumference 33b and inner circumference 33c of air core coil 33, it is difficult to coat a paint on angled parts 33d to 33g; an air blow tends to blow away the paint.

As a result, these angled parts 33d-33g may obtain a film thickness thinner than that of outer circumference 33b or inner circumference 33c.

In other words, in the case that burrs and the like are left on edge 31a of first stator core 31, and while the root part of a plurality of pole teeth of first stator core 31 has an R shape, when air core coil 33 is fitted, these burrs or the R-shaped part pushes it, causing insulating film 50 to peel off; this may cause a short circuit of the coil windings with first stator core 31 or break the coil winding.

By sandwiching insulation sheet 40, since insulation sheet 40 is more tenacious than insulating film 50, even if it contacts with the burrs generated on first stator core 31, the burrs can be covered with no possibility of breakage.

For this reason, insulation sheet 40 supplements the thickness of insulating film 50 on edge 33h (including the angled part) of air core coil 33. In this way, the insulation of first stator core 31 can be secured.

When assembling the stepping motor 1 mentioned above, insulation sheet 40 is bonded firmly with an adhesive to first stator core 31 (or second stator core 32) from which first motor case 37 (or second motor case 38) is removed as shown in FIG. 2.

After bonding, air core coil 33 (or air core coil 34) is fitted to the outer circumferences of pole teeth of first stator core 31 (or the second stator core 32), thereby adhesively fixing air core coil 33. And terminal block 35 is press fitted to fitting parts 31b, 32b of each of the stator cores 31 and 32 to temporarily interlock the terminal block. Moreover, terminals 33a and 34a of each of the coils 33 and 34 are wound around terminal pin 36.

Next, first motor case 37 (or second motor case 38) is attached to build stator part 3. This stator part 3 is arranged opposite to rotor magnet 22 via a gap as shown in FIG. 1. At this point, terminal block 35 is bonded to motor cases 37 and 38 to be secured finally.

In addition, since the assembly of stepping motor 1 is the same as that of a conventional stepping motor or the like of public domain, its detailed description is omitted here.

Furthermore, although the embodiment described above is an example of preferable modes of the present invention, the present invention is not limited to this. A variety of modifications can be made within the scope of the present invention.

For example, although base 36a of terminal pin 36 is formed in the axial direction of motor 1 in the mode of this embodiment, the present invention is not limited to this, and it may be formed along the circumference thereof. Moreover, although the edges of base 36a project from the terminal block 35, it is not necessary to so project. Furthermore, although projection 42 and step 43 are formed on terminal part 35 in the mode of this embodiment, they do not need to be present; they can be formed when they are required.

Moreover, terminal pin 36 is formed with an insulation material made of a liquid crystal polymer by insert molding in the mode of this embodiment. However, the mode of this embodiment is not limited to this. It may be insert molded with an insulation material made of a different type of material. Alternatively, terminal pin 36 may be provided to terminal block 35 by press fitting and the like.

Furthermore, stepping motor 1 with two stator cores 31 and 32 is used in the mode of this embodiment. However, the present invention is not limited to this. It may have only one stator core. Moreover, although the stepping motor which utilizes an air core coil as a drive coil without a bobbin is adopted. However, the mode of this embodiment is not limited to this. The stepping motor with a bobbin wound with a coil may also be adopted.

Moreover, although first motor case 37 is formed by cutting, in the axial direction, two planes facing each other on the circumferential side plane of a cylindrical shape with a bottom, the mode of embodiment is not limited to this. As shown in FIG. 10, first motor case 37 may have an oval shape by reducing work in which a cylindrical shape has a bottom, and the flat side wall parts may be provided with openings by punching. In this case, a small portion of the edge on the bottom 37a side of opening 46 remains and functions as rib 37b. In this way, deformation of first motor case 37 can be suppressed.

Moreover, although laser welding is performed along the axial direction in the mode of this embodiment, it may be performed in the slanted direction. Moreover, although mounting plate 45 is made sufficiently larger than the bottom 37a of motor case 37, the mode of this embodiment is not limited to this. Mounting plate 45 may have the same width as that of bottom 37a of motor case 37 as shown in FIG. 9. In this case, it is preferable that the laser be irradiated in the direction perpendicular to the axis, that is, in parallel with mounting plate 45.

In this embodiment, the material of the insulation sheet 40 is polyethylene terephthalate. However, the material is not limited to this. It may be polyester, polyimide resin, and the like.

In addition, by making insulation sheet 40 using the same polyimide resin as insulating film 50, a stepping motor with excellent insulation and heat-resistance characteristics can be produced.

Moreover, in this embodiment, insulation sheet 40 is fixed with an adhesive. However, the embodiment is not limited to this, and the insulation sheet 40 may be fixed by press fitting without an adhesive.

Furthermore, in this embodiment, insulation sheet 40 has a ring shape. However, the mode of this embodiment is not limited to this, and the insulation sheet may have another shape in which it is provided partially.

By feeding a given current through air core coils 33 and 34 of stator part 3 in stepping motor 1 configured in the above described manner, the rotor magnet is rotatory energized by the magnetic interaction between stator part 3 and rotor magnet 22, causing rotor shaft 21 integrated into the rotor magnet to rotate as well.

In addition, since the operation of stepping motor 1 is the same as that of a conventional stepping motor or the like of public domain, the detailed description of stepping motor 1 is omitted herein.

The stepping motor comprises a stator core, a drive coil to be attached to the stator core, and a terminal block provided with a plurality of terminal pins to be wound with the terminals of the drive coil windings, wherein the fitting part of the terminal block is fitted to the fitting part of the stator core and a gap is provided between the terminal block and the drive coil. Since a terminal block and the stator core are separate components, the terminals can be arranged with a higher degree of freedom.

According to the stepping motor mentioned above, since a terminal block and the stator core are separate components, terminals can be arranged at a higher degree of freedom. As a result, miniaturization of a terminal block can be achieved without the conventional linear arrangement along the circumference; this consequently makes miniaturization of a motor possible. Moreover, since a terminal block can be formed separately from a stator core by insert molding, press fitting, or the like; components can be made at low cost.

Moreover, in the stepping motor, a plurality of projections are formed on the periphery of the fitting part of the terminal block on the side to be fitted with the fitting part of the stator core to prevent the windings from breaking and the terminal block from falling. In this way, the windings do not touch the edge of the motor case and prevents the windings from breaking and the terminal block from falling.

Furthermore, the stepping motor comprises a stator core, a drive coil to be attached to the stator core, and a terminal block provided with a plurality of terminal pins to be wound with the terminals of the drive coil windings, wherein the fitting part of the terminal block is fitted to the fitting part of the stator core and, at the same time, a step is formed around the terminal pins of the terminal block to prevent the windings from breaking at the time of connection with the outside, and what is more, the windings are wound around the terminal pins after being laid along the step. since the windings are wound at a right angle with respect to the terminal pins, when attaching an FPC or the like from the outside of the motor, the edge of the FPC does not touch the windings; this prevents the windings from breaking.

Furthermore, in the stepping motor, the drive coil is an air core coil. As a result a small stepping motor without a coil bobbin can be used.

While the foregoing description and drawings represent the present invention, it will be obvious to those skilled in the art that various changes may be made therein without departing from the true spirit and scope of the present invention.

What is claimed is:
1. A stepping motor comprising:
   a stator core stored in a motor case;
   a drive coil which is attached to said stator core;
   a terminal block having a plurality of terminal pins to be wound with the terminals of said drive coil windings;
   said stator core and terminal block having respective fitting parts, the fitting part of said terminal block being fitted to the fitting part of said stator core; and
   wherein a gap is provided between said terminal block and said drive coil
   wherein a plurality of projections are formed on the periphery of the fitting part of said terminal block on the side to be fitted to the fitting part of said stator core to prevent said windings from breaking and said terminal block from falling
   wherein the motor case is formed with a through-hole through which the terminals of the winding of the drive coil are taken out,
   wherein the fitting part of the stator core is made up of a projection formed in the form of a through-hole to be filled to the fitting part of the terminal block.
2. A stepping motor comprising:
   a stator core;
   a drive coil to be attached to said stator core;
   a terminal block provided with a plurality of terminal pins to be wound with the terminals of said drive coil windings;
   said stator core and terminal block having respective fitting parts, the fitting part of said terminal block being fitted to the fitting part of said stator core; and
   a step being formed around said terminal pins of said terminal block to prevent said windings from breaking at the time of connection outside said motor; and
   wherein said windings are wound around said terminal pins after being laid along said step
   wherein the terminal block is formed having a recessed portion where the terminal pin is installed and the recessed portion is formed in a dented shape in a radial direction to prevent the terminals of the winding of the drive coil from breaking.
3. The stepping motor as claimed in claim 1, wherein said drive coil is an air core coil.

\* \* \* \* \*